United States Patent [19]

Buzzi

[11] Patent Number: 4,726,070
[45] Date of Patent: Feb. 16, 1988

[54] USER-SUPPORTED TRANSCEIVER SET

[76] Inventor: Francesco Buzzi, Via Nizza n. 42/2, 17100 Savona, Italy

[21] Appl. No.: 836,819

[22] Filed: Mar. 6, 1986

[30] Foreign Application Priority Data

Mar. 12, 1985 [IT] Italy .................. 12453 A/85

[51] Int. Cl.⁴ .............................................. H04B 1/38
[52] U.S. Cl. .................................... 455/89; 455/90; 455/100; 455/351
[58] Field of Search ............. 455/89, 90, 100, 128, 455/57, 347, 351

[56] References Cited

U.S. PATENT DOCUMENTS 3,808,538  4/1974  Goransson et al. .
3,868,573  2/1975  Holcomb et al. ............... 455/90
4,340,972  7/1982  Heist ............................... 455/100
4,627,107  12/1986  Hohlfeld et al. ................ 455/90

FOREIGN PATENT DOCUMENTS 2644172  7/1977  Fed. Rep. of Germany .
2513841  1/1983  France .

Primary Examiner—Jin F. Ng
Attorney, Agent, or Firm—Jacobs & Jacobs

[57] ABSTRACT

A transmitter-receiver system comprises one single transmitter (1) and numerous receivers (6) mounted in a housing (9) having vertically stacked compartments (10) for the receivers (6) and an upper compartment (11) for the transmitter (1) so that the latter can permanently support the whole system on a user's body.

10 Claims, 11 Drawing Figures

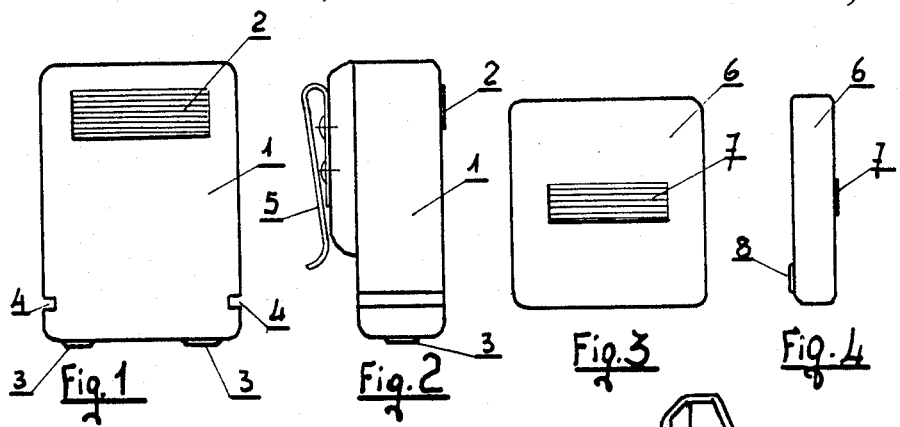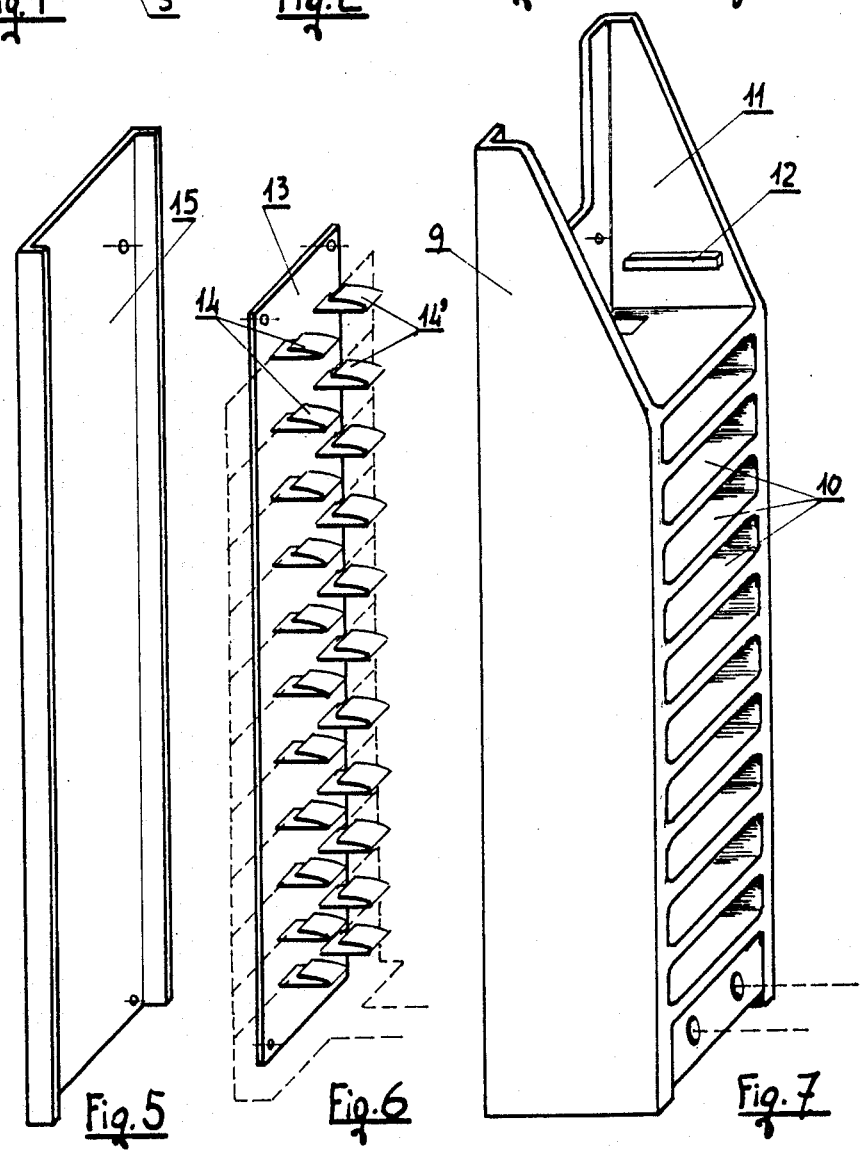

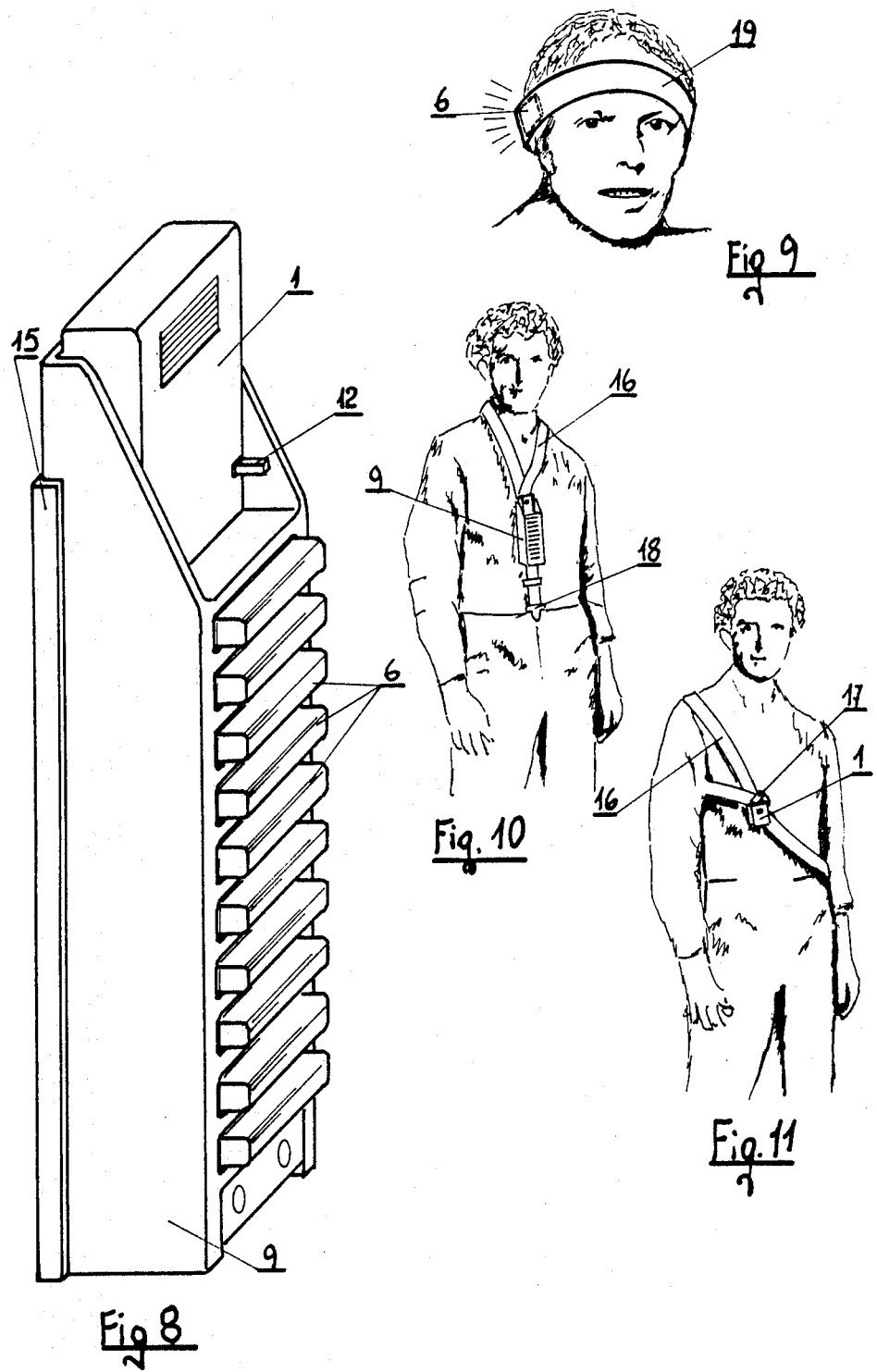

USER-SUPPORTED TRANSCEIVER SET

BACKGROUND OF THE INVENTION

1. Field of the Invention

This invention covers a system consisting of a transmitter and multiple receivers for radio communication.

2. Description of Related Art

Apart from long distance telecommunications, this invention concerns radiocommunication at sight; i.e. radiocommunications for direct instruction or correction of people operating under the direct control of an instructor or trainer (sports training, ski, horse-riding and swimming lessons, safety on sea, group excursions, work control, police actions etc.). In the radiocommunication at sight sector, a vast product range is already available on the market which have, however, numerous drawbacks.

The first of these disadvantages lies in the fact that all hitherto known systems are transceivers, which means that trainer and trainee, or instructor and pupil are both equipped with a transceiver set with a considerable purchase and investment cost and a far from negligible weight and volume to carry along.

The second drawback is that these transceiver sets can only be carried by hand so that they cannot be easily used by sportsmen or other people who need to have their hands free. Transceivers with headsets are also known, but this solution is rather cumbersome (since it requires an earpiece, microphone and antenna) and cannot always be used. Furthermore, these known transceiver types are battery-energized and these batteries have to be periodically replaced.

Even if they are fitted with rechargeable batteries, each set needs individual recharging which causes considerable inconvenience and loss of time.

Another disadvantage concerns the high purchase costs when a considerable number of transceiver sets are needed; their storage also becomes more difficult requiring more space, while handling and use may be troublesome.

SUMMARY OF THE INVENTION

This invention has the aim completely to eliminate the above disadvantages and to make available a low cost and functional transceiver system for radio communication.

According to a first characteristic of the invention, the transceiver set comprises one single transmitter and a multiple number (for instance ten) of receivers. Each component is thus greatly simplified, with much lower costs and less weight and volume to carry around.

According to a further characteristic of the invention, the transmitter and receivers are kept in a compact housing for storage and conveyance.

This is possible because of the particular miniaturization of the components having built-in antennas. The set is hooked onto a suspender of the instructor or trainer, who will then distribute the correct number of receivers to their pupils or trainees and pick them up again at the end of the training or lesson, to store them in their housing.

The receivers are placed inside earflaps or in caps, bonnets, safety helmets, for one ear only, so that the trainee's hands remain free.

According to an additional characteristic of the invention is the presence of contacts inside the housing for contemporaneous charging of all transmitter and receiver batteries.

These characteristics and others, which will be described herein, have made it possible to obtain a very simple, low cost, functional and handy system for telecommunication which can be easily stored and used, even by a variable number of users.

BRIEF DESCRIPTION OF THE DRAWINGS

The invention in question is illustrated, in its practical implementation and exemplified preferential utilization, in the enclosed drawings, in which:

FIG. 1 and FIG. 2 respectively show a front and side view of the transmitter;

FIG. 3 and FIG. 4 respectively show a front and side view of the receiver;

FIGS. 5, 6 and 7 show perspective views of the various components of the housing;

FIG. 8 shows a perspective view of the transceiver set;

FIG. 9 shows an ear protecting band in which the receiver is fitted;

FIG. 10 shows a suspender around the neck housing the set in question;

FIG. 11 shows an other type of suspender by which the set in question is slung over the shoulder.

DETAILED DESCRIPTION OF THE PREFERRED EMBODIMENTS

With reference to the above Figures, 1 represents a miniaturized transmitter with a built-in antenna, complete with a microphone 2 and two contacts 3 located on one side of the transmitter casing for battery recharging.

The casing of this transmitter 1 has two laterally transverse slots 4 for assembly on a housing 9 and a hook 5 at the back of the casing for securing the set on a suspender worn by a user.

Each receiver 6 is also miniaturized with a built-in antenna and has on one of its sides a loudspeaker 7 and on the other side two contacts 8 for battery recharging.

The housing 9 for the transmitter 1 and the receivers 6 is a box-shaped structure with numerous horizontal compartments 10 with through-holes one on top of the foregoing, for receiving the various receivers 6. A recess 11 at the top of the housing 9 receives the transmitter 1 and this recess 11 has on its side walls two opposite projecting horizontal ribs 12, which can enter into the slots 4 of the transmitter 1 so that the transmitter is installed by horizontal transverse insertion, whereby the transmitter can sustain the weight of the whole assembly by means of the hook 5, as shown for exemplification in FIG. 10.

Furthermore, the housing 9 has at the back a plate 13 provided with two vertical sets of conductor segments 14, 14' which will coincide with the contacts 3 of the transmitter 1 and with the contacts 8 of the receivers 6 mounted inside the housing 9.

Each vertical set of lamellar contacts 14 or 14' is parallel connected (short-dashed lines) and can be energized by a recharging set which may be either independent or incorporated, preferably in the lower portion of the housing 9.

Recharging may be from the mains or by light cells.

The housing is completed by a rear cover 15 fastened by screws or other means thereto. The container should be preferably in plastic material.

Based upon the above description, a transmitter-receiver assembly according to this invention is exemplified in FIG. 8, featuring a transmitter 1 and ten receivers 6, although any number of receivers will be possible according to need and application.

This assembly is properly sustained by an adjustable suspender 16 with buckles 17 to be hooked to a belt by clips 18. This suspender 16 slung around the neck (FIG. 10) or shoulder (FIG. 11) crosses the breast by means of a buckle fitted with an eyelet in which to secure the transmitter hook 5. Therefore, the whole assembly (FIG. 10) or the transmitter only (FIG. 11) may be sustained by the suspender, according to whether the housing can be located elsewhere.

If the individual who is transmitting has the whole assembly hanging from the suspender, delivery and retrieval of the receivers wil be much easier since they can be distributed and then back without any loss of time, even during lessons or training.

The various receivers are mounted at the user's ear with the aid of a headband 19 (FIG. 9) fitted with a pocket in which to place the receiver. Obviously, the receivers can also be kept in bathing caps (for swimming, water-polo etc.), helmets (motorbikes, soccer etc.) or in any other way, instead of in the headband, according to need.

It is clear that the receivers and transmitter shall both be water-tight if they are used in the water.

I claim:

1. A portable system for permitting radio communication between a transmitter operator and a plurality of receiving individuals, comprising:
   (a) radio transmitter means for transmitting audio information;
   (b) support means for supporting the transmitter means on the transmitter operator;
   (c) a plurality of radio receiver means, each operative for receiving the audio information transmitted by the transmitter means;
   (d) means for supporting each receiver means on a respective receiving individual during system use; and
   (e) a housing having a plurality of receiver storage compartments for storing respective receiver means during system non-use, and a transmitter storage compartment for storing the transmitter means,
      (i) said receiver storage compartments being stacked one above another along a longitudinal direction, and said transmitter storage compartment being located above the receiver storage compartments, and
      (ii) each compartment having means for electrically energizing a respective one of the transmitter means and the receiver means stored in a respective compartment during system non-use.

2. The system of claim 1; and further comprising holder means for holding the housing on the transmitter means and, in turn, for supporting the housing on the transmitter operator.

3. The system of claim 2, wherein the holder means includes a pair of elongated projections extending transversely of the longitudinal direction and located within the transmitter storage compartment, and wherein the transmitter means includes a casing having elongated slots also extending transversely of the longitudinal direction, said slots receiving the projections during transverse insertion of the transmitter means into the transmitter storage compartment.

4. The system of claim 1, wherein the support means for supporting the transmitter means includes a hook suspended from a harness worn on the body of the transmitter operator.

5. The system of claim 4, wherein the harness extends about the neck of the transmitter operator.

6. The system of claim 4, wherein the harness extends about the shoulder of the transmitter operator.

7. The system of claim 4, wherein the harness includes an elongated strap, and means for adjusting the strap length.

8. The system of claim 1, wherein the means for supporting each receiver means includes a headband for encircling the head of each receiving individual, said headband having a pocket in which a respective receiver means is contained in proximity to the ear of the respective receiving individual.

9. The system of claim 1, wherein the transmitter means includes a microphone, and wherein each receiver means includes a speaker.

10. The system of claim 1, wherein the transmitter means includes a transmitter casing, and wherein each receiver means includes a receiver casing, and wherein the energizing means includes a first pair of electrical contacts externally located on each casing, and a second pair of electrical contacts internally located within each compartment.

* * * * *